July 2, 1940.  B. MILLER  2,206,849
SPARK COIL TESTING
Filed Nov. 8, 1938
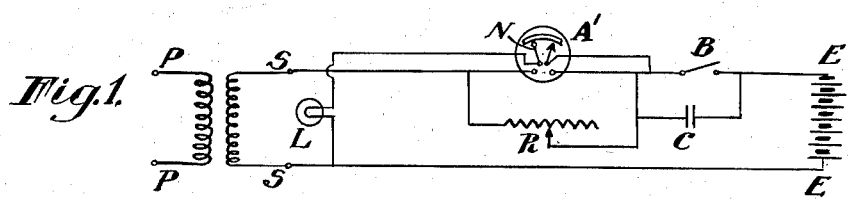
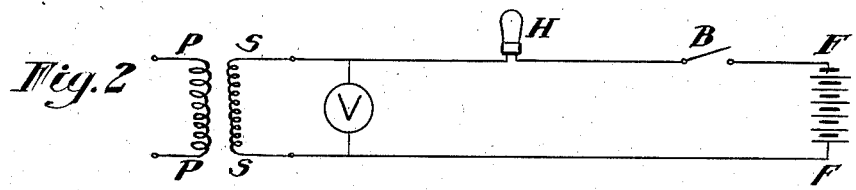
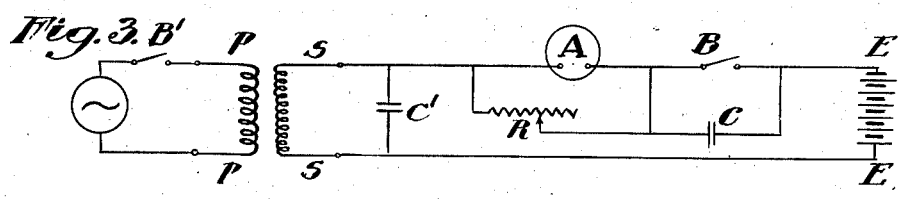
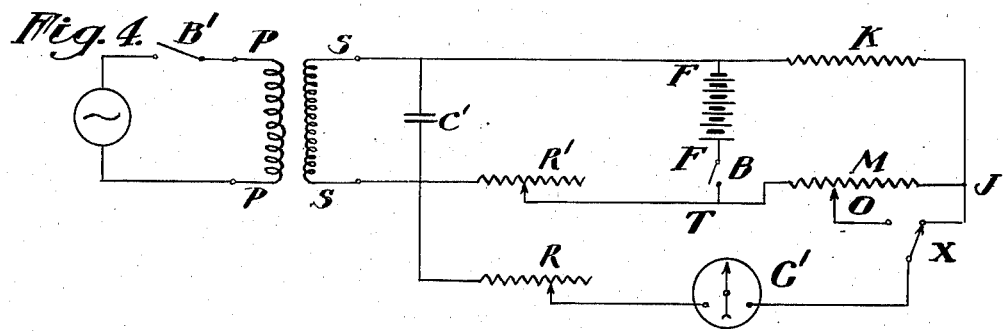
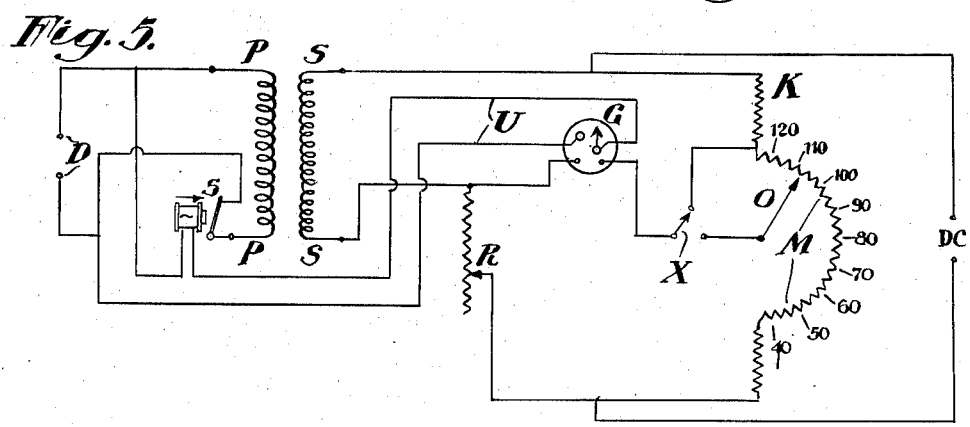
INVENTOR
BENJAMIN MILLER
BY
ATTORNEY Patented July 2, 1940

2,206,849

UNITED STATES PATENT OFFICE 2,206,849

SPARK COIL TESTING

Benjamin Miller, Richmond Hill, N. Y., assignor to Power Patents Company, Hillside, N. J., a corporation of Maine Application November 8, 1938, Serial No. 239,433

16 Claims. (Cl. 175—183)

This invention relates to the testing of automobile spark coils, and is particularly concerned with improved method and means for imparting a predetermined degree of preheat to an ignition coil under test.

In testing automobile ignition spark coils it is desirable that the coil be heated to its normal service operating temperature in order that the results of the tests may not be misleading. This coil preheating operation has been heretofore accomplished by passing an alternating current of definite value through the primary winding of the coil for a definite time while short circuiting the secondary winding. At the end of the definite period allotted for heating the coil, the flow of current is interrupted as by means of clockwork mechanism.

Methods heretofore employed or suggested for preheating ignition coils to definite service operating temperatures have not in general proven effective or satisfactory. The amount of heat developed in a coil by flow of a definite current therethrough for a definite time depends not only upon the current and the time, but also on the resistance of the coil. The resistance of the coil is a variable factor, as is also the heat dissipation from the coil and the heat capacity of the coil, the latter two factors depending on the construction of the coil, including materials, size, and arrangement, and the ambient temperature. Since the final temperature attained in preheating a coil is a function of energy input, heat dissipation, and heat capacity, the actual temperature to which the inside of one coil is heated by a definite current flow over a definite time will not be the same as the temperature to which another coil is heated by the same current for the same time; nor will the temperature to which the inside of the coil is preheated be the same on two tests, even though the current and time are the same, if one test is made when the room temperature is low and the second test is made when the room temperature is high.

The primary object of the present invention is to provide improved method and means whereby an ignition coil or like device may be efficiently and reliably preheated to a definite predetermined temperature.

The present invention contemplates preheating an ignition coil to a predetermined definite internal temperature by passing electric current either through the primary winding or through the secondary winding of the coil, while using the coil secondary as a resistance thermometer whereby to indicate the internal coil temperature and the time at which the supply of heating current shall be cut off.

With the above and other objects and features in view, the invention consists of improved method and means for preheating ignition coils which are hereinafter described and more particularly defined by the accompanying claims.

In the following explanation of the invention, reference will be made to the accompanying drawing, in which:

Fig. 1 is a wiring diagram of one form of coil preheating and temperature measuring apparatus in accordance with the present invention;

Fig. 2 is a wiring diagram of a modified form of coil preheating and temperature measuring apparatus;

Fig. 3 is a wiring diagram of another modification of the apparatus in which the heating current is supplied at least in part to the primary winding;

Fig. 4 is a wiring diagram of still another modification of the apparatus embodying a Wheatstone bridge circuit including the secondary winding of the coil as one leg of the bridge; and Fig. 5 is a wiring diagram of still another modification of the apparatus in which a switch mounted in a heating circuit embodying the primary winding, is operatively controlled by a galvanometer relay connected in a Wheatstone bridge circuit embodying the secondary winding.

The resistance thermometer element of the present ignition coil preheating means has to be adapted for use with coils of many types. For this reason the invention contemplates the use of the coil secondary as the resistance thermometer element, because all ignition coil secondaries are wound with copper wire. It is a characteristic of copper that its electrical resistance increases with temperature. In the range of coil temperatures which is employed in coil testing, the resistance of the coil secondary may be expressed by the formula $$R = K(t+390) \quad (1)$$

where

R is the resistance,
K is a constant for any coil, and
$t$ is the coil temperature—in Fahrenheit degrees.

Equation 1 leads to Equations 2 and 3

$$R_c = K(t_c+390) \quad (2)$$
$$R_h = K(t_h+390) \quad (3)$$

where $R_c$ is the resistance when the coil is cold,
$t_c$ is the temperature when the coil is cold,
$R_h$ is the resistance when the coil is hot,
$t_h$ is the temperature when the coil is hot.

Dividing Equation 3 by Equation 2

$$\frac{R_h}{R_c} = \frac{t_h+390}{t_c+390} \quad (4)$$

Equation 4 does not contain K; that is, it is true for all coils. This equation suggests that if the room temperature is measured and if the desired final temperature of the coil is known, the resistance of the secondary winding should be measured before heating, and then the heating of the coil should be continued until the resistance of the secondary reaches the value obtained by solving Equation 4 for $R_h$. For example, if the room temperature is 60° F. and it is desired to heat to 150° F. a coil the secondary winding of which has a resistance of 5000 ohms at room temperature, the heating should be continued until the secondary resistance becomes 6000 ohms.

It is not necessary to know the resistance of the secondary winding in ohms, if the ratio of hot resistance to cold resistance is known; that is, if the room temperature is known and if the desired final temperature is known, the heating should continue until the coil resistance increases by a certain fraction, which fraction is given by the following equation:

$$1+x=\frac{t_h+390}{t_c+390} \qquad (5)$$

where $x$ is the fractional increase in resistance. Using for example in this equation a room temperature of 75° F. and a test temperature of 165° F., $x$ is found to be .1935, and this will be true for all coils regardless of their resistance.

Referring now to the wiring diagram of Fig. 1, there is shown a coil having a primary winding PP and a secondary winding SS. The secondary winding SS is connected through an ammeter A' to a source of constant potential D. C. current EE, when a switch B is closed. The circuit of Fig. 1 may be employed for coil preheating by noting the current in the circuit as indicated by A' immediately after closing switch B, and continuing the flow of current in the circuit until the reading of A' drops to a value which depends on the initial reading and on $x$, where $x$ is a function of the room temperature and the test temperature. Thus if the desired preheating temperature of the coil is 180° F., the instrument operator may have before him a table or chart showing values of $x$ corresponding to various room temperatures, which table may be calculated by solving Equation 5. Thus, if the room temperature is 90° F., $x=.1875$. If the current measured by A' immediately after closing switch B is 76 milliamperes then the heating of the coil to 180° F. is completed when the reading of A' drops to 64 milliamperes.

The chart of $x$ values can be eliminated by including in the circuit of Fig. 1 an adjustable shunt resistance R for ammeter A', and by calibrating the ammeter in terms of room temperature. With this improved design of unit, the operator closes switch B and adjusts resistance R until the ammeter reading reaches a definite point on its scale, which may be a red line at full scale. The operator then watches the ammeter and opens switch B when the needle drops down to a point on the scale which marks the temperature of the room, which temperature may be obtained by a thermometer (not shown). A condenser C may be shunted across switch B to prevent sparking when the switch opens. Also ammeter A' may have a suppressed zero to increase the useful scale length.

The ammeter A' which is illustrated in Fig. 1 is also equipped with a movable pointer N in addition to the ammeter needle. In other words, the complete resistance measuring unit shown in Fig. 1 is a galvanometer relay of the contact making ammeter type having in one of its leads a signal lamp L. In operating this unit the movable pointer N is first set to room temperature on the galvanometer scale and the operator then closes switch B and adjusts R to bring the ammeter needle to the full scale line. The operator may then occupy himself with other matters until the temperature of the coil reaches the preselected value; when it does, the galvanometer needle makes contact with the pointer N. When this contact is made, current flows through lamp L to light this lamp, thereby indicating to the operator that he should open switch B. It will of course be recognized that some other signal such as a bell may be used in place of the lamp L. Likewise galvanometer relays of other types than that illustrated may be substituted for the galvanometer relay just described. Likewise, while not illustrated in Fig. 1, the galvanometer relay can just as well be connected so as automatically to operate switch B when the galvanometer needle reaches the control point corresponding to the room temperature.

In the apparatus set-up illustrated in Fig. 2, the coil secondary SS has been connected in closed circuit with a source FF of current which need not be of constant potential, and a voltmeter V has been connected in shunt across the secondary coil. A ballast H (shown as a constant current glow lamp or amperite) is included in the circuit to maintain constant the current supplied to the secondary coil. In operating this apparatus the voltage is noted immediately after closing switch B, and as the coil heats up this voltage rises. When the voltage has risen by $x$, switch B is opened. The circuit of Fig. 2 can be modified to obtain direct readings in terms of the room temperature by including in the circuit an adjustable resistance or other means of calibrating or varying the sensitivity of voltmeter V. Also for the voltmeter V may be substituted a galvanometer relay which will operate a signal or automatically open switch B to cut off the heating current when the meter needle reaches a control point which is set in accordance with the room temperature.

In the circuits of Figs. 1 and 2 the heating of the coil is accomplished altogether by current passing through the secondary winding. It is possible to employ any of the circuits previously discussed while heating the coil, at least in part, by current passing through the primary winding. Moreover the current passed through the primary may be either A. C. or D. C., whichever is more convenient. If A. C. current is used for heating the primary, a condenser C' is preferably shunted across the secondary (see Fig 3) in order to limit the alternating voltage which would otherwise reach the D. C. equipment in the secondary circuit.

In the modified circuit which is illustrated in Fig. 4, a Wheatstone bridge is employed which for ease in description will be assumed as an equal arm bridge. In this bridge a leg K has a resistance equal to the resistance of leg M; likewise the total resistance of R' is at least as great as the resistance of the secondary SS of any coil which is to be tested. R' is illustrated as an adjustable resistance. By moving the slider of R' the resistance of that portion of R' which is included in the bridge circuit can be adjusted to a value not greater than the resistance of the secondary of any coil which is to be tested. With the coil SS connected in the bridge circuit, a switch B closed and a second switch X in position to connect galvanometer G' to the junction J of legs K and M of the bridge, resistance R' is adjusted until the current flow through G' is zero. During the foregoing test a switch B' in the A. C. heating circuit for the primary winding PP is held open. On completion of the calibration which is described, the resistance of that portion of R' which is in circuit in the bridge is equal to the cold (i. e. room temperature) resistance of secondary SS. The resistance M is calibrated in terms of temperature, and the slider O of M is now set to the calibration point marking room temperature. Switch X is then thrown to connect galvanometer G' with the slider of M. Current then flows through G' and the needle deflects to show current flow, but the magnitude of the deflection need not be noted. Switch B' in the primary heating circuit is then closed. As the coil heats up the deflection shown on galvanometer G' decreases, and when the current has heated the coil to a point where the galvanometer deflection is zero, the coil has reached the desired room temperature and the switches B' and B may be opened. In this circuit the potential of source FF need not be constant nor need the current be maintained constant.

The marking of the temperature scale on the resistance M (Fig. 4) is done according to Equation 5. Thus if $t_h=180$ and $t_c=90$, $x=.1875$. Then if the desired test temperature of the coil is 180° F. the point on M which is marked "90" will be located so as to make the resistance of leg K plus the resistance of that portion of M between its junction with K and the slider equal to 1.1875 times the resistance between the slider and the junction of M with the source FF and switch B. Thus, for example, if the resistance K is 5000 ohms and the full resistance of M is 5000 ohms, then the 90° temperature mark will be so located on resistance M that the resistance between the junction T with switch B and the 90° mark is 4571 ohms. The corresponding values for room temperature from 30° F. to 120° F. are:

| Room temperature | Resistance between T and slider O |
|---|---|
| 30 | 4242 |
| 40 | 4300 |
| 50 | 4356 |
| 60 | 4412 |
| 70 | 4466 |
| 80 | 4519 |
| 90 | 4571 |
| 100 | 4623 |
| 110 | 4673 |
| 120 | 4722 |

From this table it will be noted that the slider of adjustable resistance M need be moved over only about ten per cent of the full length of M in covering the range of room temperature which will be encountered.

As illustrated in Fig. 4, the sensitivity of galvanometer G' to unbalance voltage may be controlled by a variable resistance R which is connected in series with G'. Resistance R is included in the circuit in order to protect galvanometer G' against excessive current.

The coil preheating apparatus which is illustrated in Fig. 5 includes a primary coil heating circuit having a source D of A. C. or D. C. potential including an automatic switch S which may be of the solenoid actuated type. The secondary winding of the coil is, in Fig. 5, hooked up as one leg of a Wheatstone bridge electric circuit. Another leg is formed by the adjustable resistance R, a third leg by the fixed resistance K and a fourth leg by a slide wire resistance M. A switch X is provided in position corresponding to the positon of switch X of the circuit of Fig. 4; and galvanometer relay G is substituted in the apparatus of Fig. 5 in place of the galvanometer G' in the circuit of Fig. 4. Galvanometer relay G has its control circuit U connected to the solenoid switch S, so that when the coil is heated by a flow of current through the primary to the desired room temperature, the Wheatstone bridge circuit, embodying secondary SS as one leg, operates through the galvanometer relay automatically to open switch S.

Having thus described the preferred form of the invention, what is claimed as new is:

1. In testing a spark coil having primary and secondary windings, the steps comprising, passing an electric heating current through a winding of said coil to heat the same, and suspending the passage of heating current when the ratio of final resistance of the secondary winding to initial resistance equals the ratio $$\frac{T_n+390}{T_c+390}$$

where $T_n$ equals the final desired coil temperature and $T_c$ equals the initial coil temperature expressed in degrees Fahrenheit.

2. The method of preparing for test a spark coil having primary and secondary windings which comprises, applying heat to said coil electrically at a rate sufficient to ultimately cause its temperature to rise above the desired test temperature, simultaneously indicating resistance of the secondary winding of said coil, and decreasing the heat input rate to a value insufficient to cause further temperature rise when the resistance of said secondary winding corresponds to said desired test temperature.

3. The method of preparing for test a spark coil having primary and secondary windings which comprises, introducing heat into said coil electrically while maintaining a constant potential difference between the terminals of the secondary winding of said coil, indicating current flowing through said secondary winding, and substantially decreasing the rate of heat input when the heating current has diminished by a predetermined fraction.

4. The method of preparing for test a spark coil having primary and secondary windings which comprises, introducing heat into said coil electrically while maintaining a constant current through the secondary winding of said coil, indicating the potential difference between the terminals of the secondary winding, and substantially decreasing the rate of heating current input when the potential difference across the secondary has increased by a predetermined fraction.

5. Apparatus for heating a spark coil having primary and secondary windings in testing said coil, comprising a constant potential source and connections for passing an electric heating current therefrom through the secondary winding, and means in the coil heating circuit for measuring the increase in resistance in the secondary winding resulting from the heating.

6. Apparatus for heating a spark coil having primary and secondary windings in testing said coil, comprising a source of potential and connections for passing an electric heating current through one of said windings, and means operatively connected with the secondary winding for measuring the increase in resistance thereof from the heating.

7. Apparatus for heating a spark coil having primary and secondary windings in testing said coil, comprising a constant potential source and connections for passing an electric heating current therefrom through the secondary winding, and an ammeter in the secondary heating circuit for measuring the increase in resistance thereof resulting from the heating.

8. Apparatus as defined in claim 7 in which the ammeter is a contact-making ammeter, calibrated in terms of room temperature, together with means operable by the ammeter for controlling the heating current circuit.

9. Apparatus for heating a spark coil having primary and secondary windings in testing said coil, comprising a constant potential source and connections for passing an electric current therefrom through the secondary winding, means for passing an electric heating current through the primary winding of the coil, and means for measuring the increase in resistance of the secondary winding resulting from the heating.

10. Apparatus as defined in claim 9 in which an alternating current source is employed for heating the primary winding, and in which a condenser is shunted across the secondary winding.

11. Apparatus for heating a spark coil having primary and secondary windings in testing said coil, comprising a Wheatstone bridge electric circuit embodying the secondary winding as one leg, together with a source of electric current for heating the coil to normal operating temperature, said bridge having a pair of balanced fixed resistances joined together and an adjustable resistance leg which can be balanced with the secondary winding, a switch for opening and closing the heating circuit, and a device connected in shunt across the bridge for indicating the unbalance voltage of the bridge.

12. Apparatus as defined in claim 11 in which one of the balanced fixed resistances is calibrated in terms of temperature and is provided with a sliding contact, together with a switch adapted to alternatively connect the said indicating device to the sliding contact and to the junction point of the fixed resistances.

13. Apparatus as defined in claim 11, together with a variable resistance connected in series circuit with the indicating device.

14. Apparatus for heating a spark coil having primary and secondary windings in testing said coil, comprising an electric heating circuit embracing the primary winding and including a switch, a Wheatstone bridge electric circuit embracing the secondary winding as one leg thereof, said bridge having a pair of balanced fixed resistances joined together and an adjustable resistance leg which can be balanced with the secondary winding, an indicating device responsive to the unbalance voltage of the bridge, a sliding contact for one of said balanced fixed resistances, a switch adapted to alternatively connect the said indicating device to the sliding contact and to the junction point of the fixed resistances, and means operable by said device for actuating the switch in the primary heating circuit.

15. Apparatus for heating a spark coil having primary and secondary windings in testing said coil, comprising a constant potential source and connections for passing an electric heating current through the secondary winding, an ammeter connected in the heating current circuit and calibrated in terms of room temperature, a switch in the heating circuit whereby the current flow may be interrupted when the ammeter reading reaches a value corresponding to the desired coil temperature, and an adjustable resistance shunted across the ammeter for calibrating the same.

16. Apparatus for heating a spark coil having primary and secondary windings in testing said coil, comprising means for passing an electric heating current through the secondary winding, means adapted to maintain constant the current in the heating circuit, a voltmeter shunted across the secondary winding for measuring the increase in resistance of the coil resulting from such current passage, and a switch in the heating circuit whereby the current flow may be interrupted.

BENJAMIN MILLER.